US006617596B1

(12) United States Patent
Korenev

(10) Patent No.: US 6,617,596 B1
(45) Date of Patent: *Sep. 9, 2003

(54) ON-LINE MEASUREMENT OF ABSORBED ELECTRON BEAM DOSAGE IN IRRADIATED PRODUCT

(75) Inventor: Sergey Alexandrovich Korenev, Mundelein, IL (US)

(73) Assignee: Steris Inc., Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/715,481

(22) Filed: Nov. 17, 2000

(51) Int. Cl.[7] ............................ G21G 5/00; G21K 1/02; G01N 27/00

(52) U.S. Cl. ................................ 250/492.3; 250/363.1; 250/208.1; 250/336.2; 250/397; 324/370.01; 324/71.3; 324/71.4

(58) Field of Search ........................... 250/208.1, 363.1, 250/336.2, 397, 492.3; 324/370.01, 71.3, 71.4

(56) References Cited

U.S. PATENT DOCUMENTS

| | | | | | |
|---|---|---|---|---|---|
| 3,857,090 | A | * | 12/1974 | Chick | 250/394 |
| 4,467,197 | A | | 8/1984 | Stieber | 250/305 |
| 4,633,172 | A | * | 12/1986 | Ekdahl et al. | 250/397 |
| 5,396,074 | A | | 3/1995 | Peck et al. | 250/453.11 |
| 5,401,973 | A | | 3/1995 | McKeown et al. | 250/429.3 |
| 5,451,794 | A | | 9/1995 | McKeown et al. | 250/492.3 |
| 5,475,228 | A | * | 12/1995 | Palathingal | 250/397 |
| 5,591,969 | A | | 1/1997 | Park et al. | 250/287 |
| 5,635,714 | A | * | 6/1997 | Nablo et al. | 250/305 |
| 5,661,305 | A | * | 8/1997 | Lawrence et al. | 250/397 |
| 6,429,444 | B1 | * | 8/2002 | Korenev et al. | 250/397 |

FOREIGN PATENT DOCUMENTS

| | | |
|---|---|---|
| GB | 721 235 | 1/1955 |
| WO | WO 01/14911 | 3/2001 |

OTHER PUBLICATIONS

Kneeland, et al., "Industrial Use of the Real Time Monitor for Quality Assurance in Electron Processing", Radiation Physics and Chemistry, Elsevier Science Publishers BV., Amsterdam, NL vol. 55, No. 4, Jul. 11, 1999 pp. 429–436, XP004169518.

McKeown, et al. IMPELA News, Dec. 1995, V. 2, No. 4.

* cited by examiner

*Primary Examiner*—Jack Berman
*Assistant Examiner*—K. Fernandez
(74) *Attorney, Agent, or Firm*—Fay, Sharpe, Fagan, Minnich & McKee, LLP

(57) ABSTRACT

An accelerator (10) generates an electron beam (22) of selected energy that is swept (16) up and down. A conveyor (32) moves items (30) through the electron beam for irradiation treatment. An array (40*a*) of inductive electron beam strength detectors is disposed on a down stream side of the item to detect the energy of the electron beam exiting the item at the plurality of altitudes. The electron beam strength entering and leaving the item are communicated to a processor (54) which determines the absorbed dose of radiation absorbed by the item. The dose information is archived (56) or compared by a parameter adjustment processor (58) with target doses and deviations are used to control one or more of MeV or beam current of the electron beam, the sweep rate, and the conveying speed of the items. Each of the detectors includes a vacuum chamber in which two current transformers (60, 62) disposed on either side of a metal foil layer (64). From the difference in the current induced in the two transformers by a pulsed, collimated electron beam, the energy of the beam is determined.

32 Claims, 3 Drawing Sheets

ON-LINE MEASUREMENT OF ABSORBED ELECTRON BEAM DOSAGE IN IRRADIATED PRODUCT

BACKGROUND OF THE INVENTION

The present invention relates to the irradiation arts. It finds particular application in conjunction with measuring the absorbed radiation dose in systems for irradiating objects with an electron beam and will be described with particular reference thereto. It is to be appreciated, however, that the invention will also find application in conjunction with the monitoring of charged particle beams in coating by a synthesis of powdered material, surface modification of material, destruction of toxic gases, destruction of organic wastes, drying, disinfection of food stuffs, medicine, and medical devices, polymer modification, and the like.

Heretofore, electron or e-beam irradiation systems have been developed for treating objects with electron beam radiation. An accelerator generates electrons of a selected energy, typically in the range of 0.2–20 MeV. The electrons are focused into a beam through which containers carrying the items to be treated are passed. The conveying speed and the energy of the electron beam are selected such that each item in the container receives a preselected dose. Traditionally, dose is defined as the product of the kinetic energy of the electrons, the electron beam current, and the time of irradiation divided by the mass of the irradiated product.

Various techniques have been developed for precalibrating the beam and measuring beam dose with either calibration phantoms or samples. These precalibration methods include measuring beam current, measuring charge accumulation, conversion of the e-beam to x-rays, heat, or secondary particles for which emitters and detectors are available, and the like. These methods are error prone due to such factors as ionization of surrounding air, shallow penetration of the electron beam, complexity and cost of sensors, and the like.

One of the problems with precalibration methods is that they assume that the product in the containers matches the phantom and that it is the same from package to package. They also assume a uniform density of the material in the container. When these expectations are not met, portions of the material may be under-irradiated and other portions over-irradiated. For example, when the material in the container has a variety of densities or electron stopping powers, the material with the high electron stopping power can “shadow” the material on the other side of it from the electron beam source. That is, a high percentage of the electron beam is absorbed by the higher density material, such that less than the expected amount of electrons reach the material downstream. The variation from container to container may result in over and under dosing of some of the materials within the containers.

One technique for verifying the radiation is to attach a sheet of photographic film to the backside of the container. The photographic film is typically encased in a light opaque envelope and may include a sheet of material for converting the energy from the electron beam into light with a wavelength that is compatible with the sensitivity of the photographic film. After the container has been irradiated, the photographic film is developed. Light and dark portions of the photographic film are analyzed to determine dose and distribution of dose.

One disadvantage of the photographic verification technique resides in the delays in developing and analyzing the film.

The present invention provides a new and improved radiation monitoring technique which overcomes the above referenced problems and others.

SUMMARY OF THE INVENTION

In accordance with the present invention, a method of irradiation is provided. Items are moved through a charged particle beam. Energy of the charged particle beam entering the item is determined and the energy of the charged particle beam exiting the item is measured.

In accordance with a more limited aspect of the present invention, the difference between the entering and exiting energies is used to determine absorbed dosage.

In accordance with another more limited aspect of the present invention, the difference between the entering and exiting beam energies is used to control at least one of the entering charged beam energy, and a speed of moving the items through the charged particle beam.

In accordance with another aspect of the present invention, an irradiation apparatus is provided. A charged beam generator generates and aims a charged particle beam along a preselected path. A conveyor conveys items to be irradiated through the beam. A first beam strength calculator determines a strength of the beam before entering the item. A beam strength monitor monitors a strength of the beam after it is passed through the item.

In accordance with yet another aspect of the present invention, the beam strength calculator and the beam strength monitor include energy detectors. The detectors include first and second current transformers disposed across a metal foil from each other.

One advantage of the present invention resides in the real time measurement of absorbed dose.

Another advantage of the present invention resides in more accurate determination of absorbed doses and reducing dosing errors.

Another advantage of the present invention resides in the automatic control and modification of an irradiation process on-line to assure prescribed dosing.

Still further advantages of the present invention will be apparent to those of ordinary skill in the art upon reading and understanding the following detailed description.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
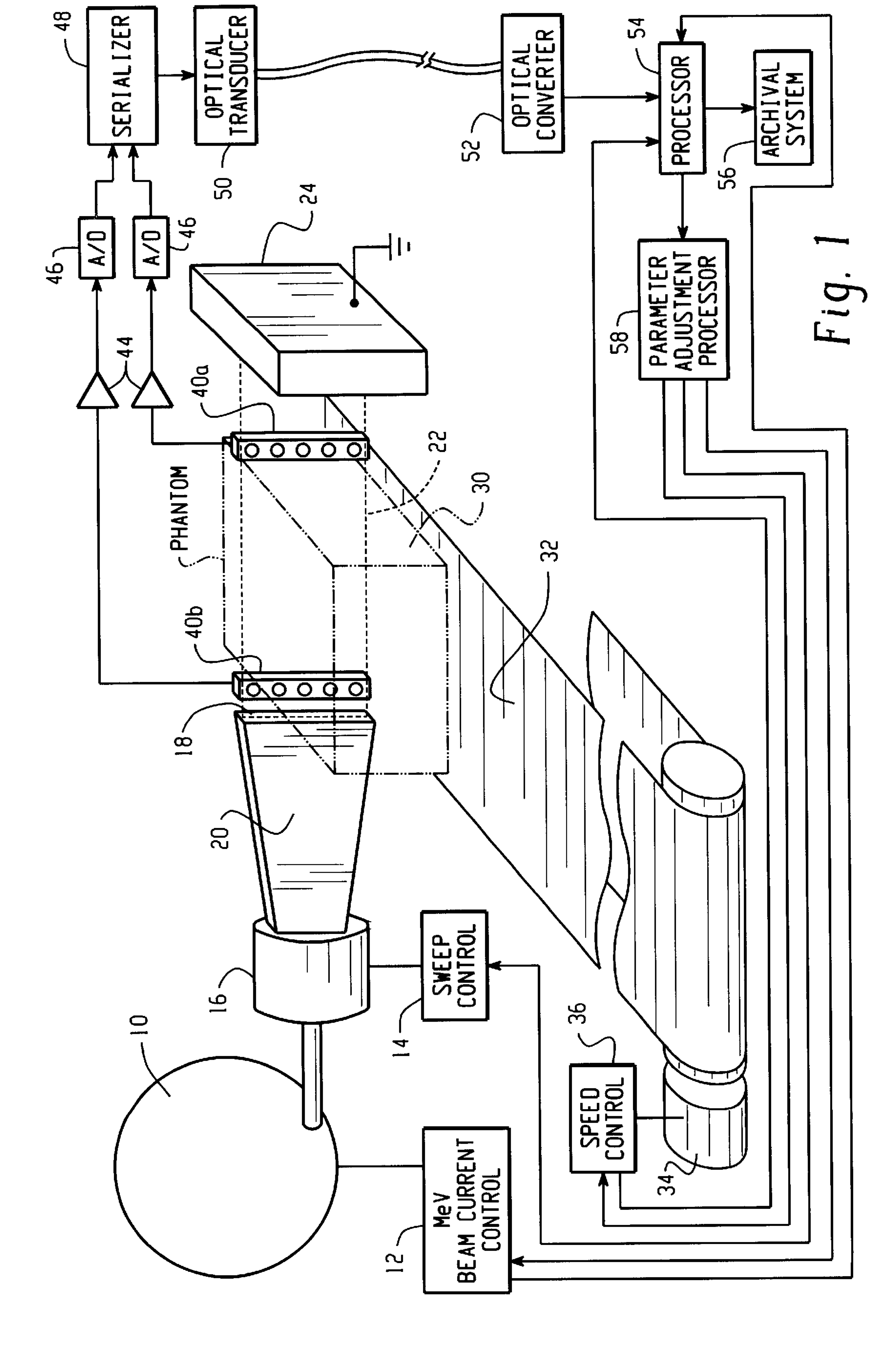
FIG. 1 is a perspective view of a e-beam irradiation system in accordance with the present invention.

With reference to FIG. 1, an accelerator 10 is controlled by a beam voltage and current controller 12 to generate a beam of electrons with a preselected energy (MeV) and beam current. In the preferred embodiment, the electrons are generated by a Rhodotron brand name accelerator in the range of 1–10 MeV. A sweep control circuit 14 controls electromagnets or electrostatic plates of a beam deflection circuit 16 to sweep the electron beam, preferably back and forth in a selected plane. A titanium or aluminum window 18 of a vacuum horn 20 defines the exit from the vacuum system from which the electron beam 22 emerges for the treatment process. An electron absorbing plate 24 collects electrons and channels them to ground.

A conveying system conveys items 30 through the e-beam 22. In the illustrated embodiment, the conveyor system includes a horizontal belt conveyor 32 which is driven by a motor 34. A motor speed controller 36 controls the speed of the motor. Of course, other types of conveyor systems are contemplated, including overhead conveyors, pneumatic or hydraulic conveyors, spaced palettes, and the like. In the illustrated belt conveyor system, the items 30 are positioned one after another on the conveyor belt closely packed with a minimal gap in between. Preferably, the items are packages or palettes of fixed size which hold individual items to be irradiated.

A plurality of radiation detector arrays 40*a*, 40*b*, are positioned in the path of the e-beam 22. The first detector array 40*a* is in array that measures the strength (energy) of the electron beam after it has exited the item. The optional second detector array 40*b* detects the energy of the e-beam before it enters the product, if the energy is not otherwise known. The outputs of both the detector arrays 40*a*, 40*b* are conveyed to an amplifier section 44 for amplification. In the preferred embodiment, the outputs are digitized 46, serialized 48, converted into optical signals 50, and conveyed to a remote location. The amplifier section 44 is shielded to protect the electronics from stray electrons and static fields that might interfere with the electronic processing. The optical signal is conveyed to a location remote from such stray charges where it is converted to selected electronic format 52 and analyzed by a processor 54, such as a computer. Preferably, the beam control 12 provides the energy of the electrons entering the product. The computer subtracts or otherwise compares the strength of the electron beam before and after it enters each item. The processor 54 further compares the strength of the beam at various distances from the conveyor (heights in the illustrated embodiment) to identify regions in which high density materials may be interfering with. complete irradiation of the downstream material. The processor determines the dose received by each region of each item and forwards that dose information to an archival system 56 such as a computer memory, a tape, or a paper printout.

In a first alternate embodiment, the processor 54 compares the measured dose information with preselected dose requirements. Based on differences between the selected and actual dosage, a parameter adjustment processor 58 adjusts one or more of the beam energy, the beam sweep, the conveyor speed, and the like. For example, when the detectors detect that near portions of the items are absorbing too much radiation leaving far portions of the items under irradiated, the parameter adjustment processor 58 increases or adjusts the accelerator to increase the MeV or the electron beam current, up to maximum values set for the items being irradiated. Once the maximum dose is reached, the adjustment processor 58 controls the motor speed controller 36 to reduce the speed of the conveyor.

When the items have small regions of higher density, the sensing of an increase in the absorbed radiation causes the parameter adjustment processor 58 to increase the energy of the electron beam or decrease the speed of the conveyor until the region of higher density has passed through the beam. Thereafter, the beam power can be reduced or the conveying speed can be increased. Analogously, when the region of higher density is localized vertically, in the illustrated horizontal conveyor embodiment, the parameter adjustment processor 56 causing the sweep control circuit 14 to adjust the sweep such that the electron beam is directed to the higher density region for a longer duration. Preferably, the beam strength and the conveying speed are also adjusted to maintain the appropriate dosing in other regions of the package. Analogously, in response to regions of little absorption of the electron beam, the sweep circuit can be controlled to dwell for a shorter percentage of the time on these regions.

In the preferred embodiment, the detectors are inductive detectors that detect the increases and decreases in electron beam energy. That is, although the electron beam may be viewed as a beam that is the full width of the horn 20, more typically the beam of electrons is focused into about a pulsed two centimeter diameter ray. This ray is swept up and down rapidly compared to the speed of the conveyor such that the electron beam is effectively a wall.

Figure 2:
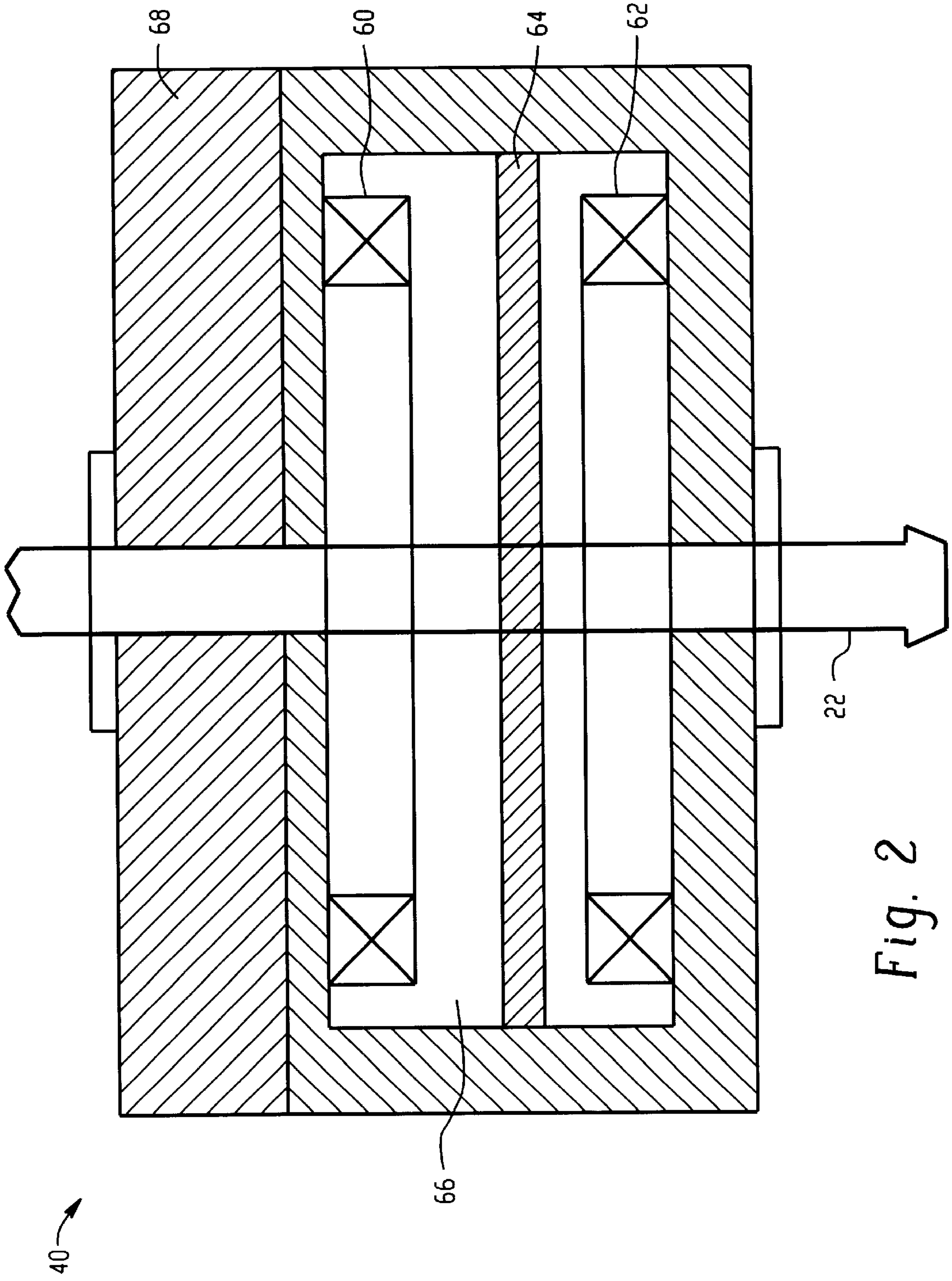
FIG. 2 is a cross sectional view of one of the detectors of FIG. 1; and, FIG. 3 is a graph of K as a function of electron kinetic energy where (1) the thickness of a foil is 300 μm and (2) the thickness of the foil is 500 μm.

More specifically to the preferred embodiment, and with reference to FIG. 2 each detector array includes a first coil or current transformer 60 and a second coil or current transformer 62. Between them, a metal foil 64, aluminum in the preferred embodiment with a selected energy absorption profile, is disposed. Both current transformers 60, 62 and the metal foil 64 are located within a vacuum chamber 66. The pulsed electron beam passes through a collimator 68 equipped with a cooling system and passes through the first current transformer 60. The sweeping electron beam 22 sends electron beam current pulses through the first transformer which induces currents circumferentially therearound in the first transformer which induced current is measured and the measurement held or stored. The beam passes through the metal foil, which is $3\times10^{-4}$ to $6\times10^{-4}$ m thick aluminum in the preferred embodiment. The beam passes through the second current transformer 62, again inducing currents. The second induced current is less than the first induced current by the amount of absorption in the foil which is based on the thickness of the metal foil 64. The currents are compared, and from that information, the energy of the electron beam is determined. The energy of the electron beam can be determined empirically by measuring the current drop between the two coils with electron beams of different known energies. Alternately, the energy can be calculated from the physics of the detector including foil thickness, atomic number of the metal in the foil, number of turns in the transformer coil, and the like.

More specifically, the scanning mode of the electron accelerator leads to a pulsed character of the electron beam in cross-section. The primary electron beam has a current $I_0$ and kinetic energy $E_0$. After propagation of the electron beam across the irradiated product, the electron beam has a kinetic energy $E_1$. The number of electrons is the same on both sides of the product, because electrons only lose kinetic energy. In the detector, the measurement of the electron beam current in front and behind the absorption foil 64 by the transforms 60, 62 enables the determination of an absorption factor K of the electron beam within the foil:

$$K=I_2/I_1=f(E) \tag{1}$$

where, $I_1$, is the beam current in front of the foil and $I_2$ is the current behind the foil. The charge Q of the beam after the foil is:

$$Q=Q_0*e^{-(m/p)*d} \tag{2}$$

where Q is charged after the foil and $Q_0$ is the charge before the foil. M/p is the mass absorption coefficient for the foil and is a function of the energy, f(E), and d is the thickness of the foil. Recognizing that current is charge per unit time, $Q=Q_0*e^{-(m/p)*d}$ yields:

$$I_2=I_1*e^{-(m/p)*d} \quad (3)$$

From measurements with a plurality of different foil thicknesses, the dependence of K on the kinetic energy of the electrons can be calibrated. Hence, the kinetic energy of the measured electrons can be determined.

Figure 3:
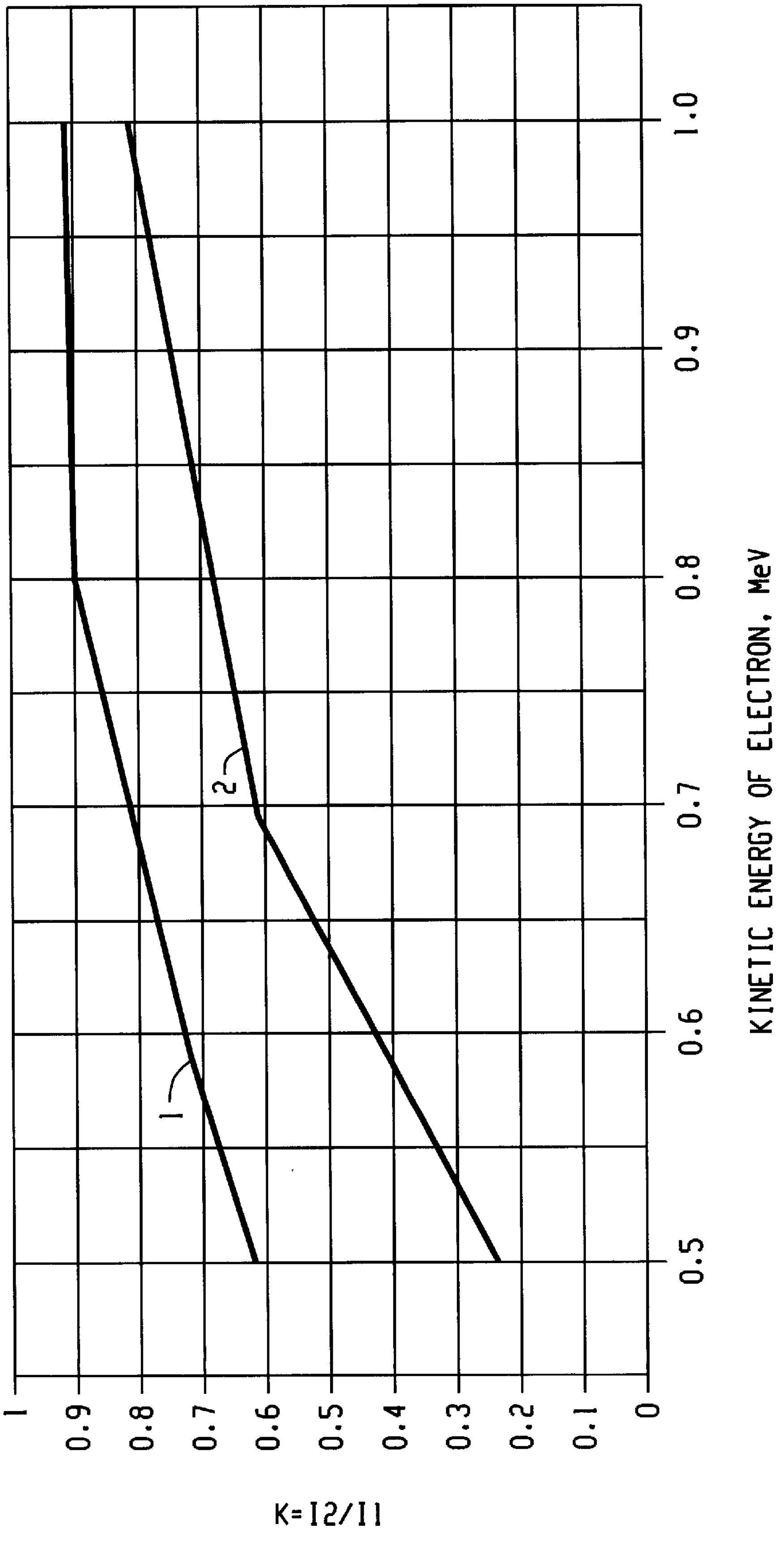

Looking to FIG. 3, a standard dependency for the coefficient of partial transmission of energy for aluminum foils of 300 and 500 μm is illustrated. After the determination of $E_1$from these measurements, the energy absorbed in the product $E_p$ is calculated by:

$$E_{p=E0}-E_1 \quad (4)$$

From the beam current which the accelerator is controlled to put out, the scanning rate and other parameters of the electron beam in the scan horn, and a diameter of the hole in the collimator 68, one can determine the number of electrons $N_e$ passing through the detector. The absorbed Joule's energy $E_j$, in the product:

$$E_j=E_p*N_e*1.6*10^{-19}\ [J] \quad (5)$$

Because the total mass of the product or package is known, the mass of the product along the ray in front of the detector with the diameter of the collimator hole is:

$$M=0.8D^2_c*L*p \quad (6)$$

where p is the density of the product, L is the thickness of the product, and $D_c$ is beam diameter after collimation. Hence, the absorb dose D is:

$$D=E_j/M \quad (7)$$

The processor 54 calculates this factor. The processor is preferably preprogrammed with lookup tables to which this factor is compared. Based on this comparison, the parameter adjustment processor 58 makes appropriate adjustments to process controls, a human readable display indicative of dosing is produced, data is stored in the archival system 56, or the like.

Although illustrated relatively large in comparison to the items, it is to be appreciated that the individual detectors can be very small compared to the items. The array 40*a* may, for example, include hundreds of individual detectors. The array 40*b* may, for example, be only a single detector.

It is also to be appreciated that the electron beam can be swept in other dimensions. For example, the beam can also be swept parallel to the direction of motion of the conveyor. When the beam is swept in two dimensions, it cuts a large rectangular swath. The electron density entering a unit area of the item per unit time is lower, but the product remains within the beam longer. The side to side movement of the beam allows for the placement of a two dimensional array above or below the items to measure absorbed dose in two dimensions.

It is further to be appreciated that this detection system can be used to detect charged beams in numerous other applications. For example, this detector can be used in conjunction with electron beams that are used to create coatings by the synthesis of powdered material, such as diamond like coatings (dlc) on tools, nanophase silicon nitrite coatings, high purity metal coatings, and the like. It can be used with charged particle beams for surface modification such as cleaning of metals, surface hardening of metals, corrosion resistance, and other high temperature applications. The detector can also be used for electron beams which are used in the destruction of toxic gases such as the cleaning of flue gases for oxides of sulfur and nitrogen, removal of exhaust gases from diesel engines, destruction of fluorine gases, destruction of aromatic hydrocarbons, and the like. The detector may also be used with charged particle beams for treating liquid materials such as for the destruction of organic wastes, the breaking down of potentially toxic hydrocarbons such as tricloroethylenes, propanes, benzenes, phenols, halogenated chemicals, and the like, and for drying liquids, such as ink in printing machines, lacquers, and paints. The detector may also be used to monitor charged particles beams in the food industry such as the disinfection of food stuffs such as sugar, grains, coffee beans, fruits, vegetables, and spices, the pasteurization of milk or other liquid foods, sanitizing meats such as poultry, pork, sausage, and the like, inhibiting sprouting, and extending storage life. It will also find application in conjunction with monitoring electron and other charged particle beams used to form other particles or other types of radiation, such as the generation of ultraviolet irradiation, conversion of the electron beam to x-rays or gamma rays, the production of neutrons, eximer lasers, the production of ozone, and the like.

The present system may also be used to monitor charged particles beams in conjunction with polymers and rubbers. The e-beam irradiation can be used for the controlled cross linking of polymers, degrading of polymers, drafting of polymers, modification of plastics, polymerization of epoxy compounds, sterilization of polymer units, vulcanization of rubber, and the like.

It is to be appreciated that the determination of dose absorption can also be used to determine the local mass of the product.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of irradiating comprising:

moving items through a charged particle beam;

determining a kinetic energy of the charged particle beam entering the item; and, measuring a kinetic energy of the charged particle beam exiting the item.

2. The method as set forth in claim 1, further including:

determining a difference between the energy of the charged particle beam entering and exiting the item; and, determining an absorbed dosage of the charged particle beam from the difference.

3. The method as set forth in claim 2, further including:

controlling at least one of a speed with which the items move through the charged particle beam and the energy of the charged particle beam in accordance with the determined absorbed dose.

4. The method as set forth in claim 1, wherein:

the items are conveyed through the charged particle beam in a first direction; and, the charged particle beam is swept back and forth in a plane perpendicular to the first direction.

5. The method as set forth in claim 1, wherein the charged particle beam is an electron beam.

6. The method as set forth in claim 1, further including:

determining a beam current absorbed by the irradiated product.

7. The method as set forth in claim 1, further including:

scanning the charged particle beam; and, measuring beam current pulses as the beam current scans past a measurement point.

8. A method of irradiating comprising:

irradiating items with a charged particle beam;

determining an energy of the charged particle beam entering the item including measuring changes in a charged particle beam current; and determining an energy of the charged particle beam exiting the item including measuring changes in a charged particle beam current.

9. The method as set forth in claim 8, further including:

measuring the charged particle beam current at a plurality of locations along the item.

10. The method as set forth in claim 9, further including:

determining reductions in the charged particle beam current at the various points along the item and determining an absorbed dose for a plurality of regions of the item from the reduced current.

11. The method as set forth in claim 8, wherein the measuring of the charged particle beam current includes:

concentrating magnetic flux changes attributable to the changing current; and with concentrated magnetic flux changes, inducing electrical currents in windings of a coil.

12. A method of detecting energy of an electron beam, the method comprising:

collimating an electron beam to a preselected cross-section;

inducing a first electromotive force with the collimated electron beam;

attenuating the collimated electron beam;

inducing a second electromotive force with the attenuated electron beam; and, comparing the first and second electromotive forces.

13. The method as set forth in claim 12, wherein:

inducing the first electromotive force includes pulsing the collimated electron beam through a first annular winding;

attenuating the collimated electron beam includes passing the electron beam through a metal layer of preselected thickness; and, inducing the second electromotive force includes pulsing the collimated electron beam through a second annular winding, the second annular winding being disposed closely adjacent the metal layer.

14. An irradiation apparatus comprising:

a charged particle beam generator for generating and aiming a charged particle beam of a first kinetic energy along a preselected path;

a conveyor which conveys items to be irradiated through the beam; and, a beam kinetic energy monitor for monitoring a second kinetic energy of the beam after it has passed through the item.

15. The apparatus as set forth in claim 14, further including:

a processor for comparing the first and second beam energies and determining a dose of the charged particle beam absorbed by the item.

16. The apparatus as set forth in claim 15, wherein the processor is disposed remote from the monitors and further including:

a transducer for converting an output of the monitors into optical signals, the transducer being disposed adjacent the monitor such that the output from the monitor is conveyed from the irradiation region in an optical format.

17. The apparatus as set forth in claim 15, wherein the beam generator includes a beam strength control circuit for controlling at least one of charged particle beam voltage and current and wherein the conveyor includes a speed control circuit for controlling a speed with which the items are moved through the charged particle beam, and further including:

a parameter adjustment processor which compares the determined absorbed doses with target absorbed doses and selectively adjusts at least one of the beam strength control circuit and the conveyor speed control circuit.

18. The apparatus as set forth in claim 17, wherein the charged particle beam generator further includes a sweep control circuit for sweeping the charged particle beam back and forth across at least one of a planar region and a volumetric region and wherein the beam strength monitor includes:

first and second current transformers in which a current is induced by the electron beam;

a metal absorbing foil disposed between the first and second current transformers whereby the current induced the second current transformer is less than the current induced the first current transformer; and, a vacuum chamber in which the first and second current transformers and the absorbing foil are disposed.

19. The apparatus as set forth in claim 14, wherein the charged particle beam generator includes an electron accelerator.

20. An energy detector comprising:

first and second inductive coils in which currents are induced by an electron beam;

a metal layer of preselected thickness disposed between the first and second inductive coils;

a beam collimator upstream of the inductive coils which collimates the electron beam to a preselected cross-section.

21. The energy detector as set forth in claim 20, further including:

a vacuum chamber in which the inductive coils and the metal foil are disposed.

22. A method of irradiating comprising:

moving items through a charged particle beam;

determining a kinetic energy of the charged particle beam entering the item;

measuring a kinetic energy of the charged particle beam exiting the item;

determining an absorbed kinetic energy by subtracting the kinetic energy of the charged particle beam exciting the item from the kinetic energy of the beam before entering the item;

dividing the determined absorbed kinetic energy by a mass of the item irradiated by the charged particle beam.

23. The method as set forth in claim 22, further including:

determining a charge deposited in the irradiated item by the absorbed charged particle beam.

24. The method as set forth in claim 23, further including:

multiplying the absorbed kinetic energy by the deposited charge.

25. The method as set forth in claim 24, wherein determining the deposited charge includes:

measuring a beam current of the charged particle beam after irradiating the product.

26. An irradiating method including:

collimating a charged particle beam to a preselected cross-section;

passing the charged particle beam through an item;

determining the energy of the beam entering the item by inducing a first electromotive force with the collimated beam;

attenuating the collimated beam with the item;

determining the energy of the beam exiting the item by inducing a second electromotive force with the attenuated electron beam; and, comparing the first and second electromotive forces.

27. A method of determining an absorbed dose deposited by an electron beam in an irradiated product comprising:

determining an absorbed kinetic energy by subtracting a final kinetic energy of the electron beam exciting the product from an initial kinetic energy of the beam before entering the product;

dividing the determined absorbed kinetic energy by a mass of the product irradiated by the electron beam.

28. An irradiation apparatus comprising:

a charged particle beam generator for generating and aiming a charged particle beam of a first energy along a preselected path;

a conveyor which conveys items to be irradiated through the beam; and, a beam strength monitor for monitoring a second energy of the beam after it has passed through the item, the monitor including:

a vacuum chamber;

first and second current transformers;

a foil having known absorption characteristics disposed between of the first current transformer and the second current transformer.

29. The apparatus as set forth in claim 28, further including:

a collimator disposed upstream of the current transformers for collimating the charged particle beam before it passes through the first current transformer, foil, and the second current transformer.

30. The apparatus as set forth in claim 28, further including:

a comparitor which compares the currents induced in the first and second current transformers and determines therefrom the energy of the charged particle beam.

31. An apparatus for detecting energy of an electron beam, the apparatus comprising:

a means for collimating an electron beam to a preselected cross-section;

a first means in which the collimated electron beam induces a first electromotive force before being attenuated;

a second means in which the electron beam induces a second electromotive force after the collimated electron beam has been attenuated; and, a means for comparing the first and second electromotive forces.

32. An apparatus for determining an absorbed dose deposited by an electron beam in an irradiated product comprising:

a means for subtracting a final kinetic energy of the electron beam exciting the product from an initial kinetic energy of the beam before entering the product;

a means for dividing the difference between the initial and final kinetic energy by a mass of the product irradiated by the electron beam.

* * * * *